United States Patent

Gay

[11] 3,936,711
[45] Feb. 3, 1976

[54] MOTOR SPEED CONTROL CIRCUIT
[75] Inventor: Michael J. Gay, Scottsdale, Ariz.
[73] Assignee: Motorola, Inc., Chicago, Ill.
[22] Filed: Sept. 28, 1973
[21] Appl. No.: 401,722

Related U.S. Application Data
[63] Continuation of Ser. No. 171,996, Aug. 16, 1971, abandoned.

[52] U.S. Cl. ............... 318/345; 318/317; 318/328; 318/331; 318/342
[51] Int. Cl.² ................. H02P 5/36; H02P 5/06
[58] Field of Search ........... 318/309, 310, 311, 312, 318/315, 317, 326, 327, 328, 342, 345, 331

[56] References Cited
UNITED STATES PATENTS

| | | | |
|---|---|---|---|
| 3,260,949 | 7/1966 | Voorhoeve | 330/28 |
| 3,458,792 | 7/1969 | Jabbar | 318/341 |
| 3,609,494 | 9/1971 | Takahashi | 318/328 |
| 3,777,235 | 12/1973 | Lahti | 318/434 |

Primary Examiner—Robert K. Schaefer
Assistant Examiner—John J. Feldhaus
Attorney, Agent, or Firm—Harry M. Weiss; Maurice J. Jones, Jr.; Michael D. Bingham

[57] ABSTRACT

There is disclosed a motor speed control circuit for use in battery-powered tape recorders, tape players and record players in which the motor speed is made independent of power supply voltage swings, temperature and loading. The circuit is comprised of three sections including a discriminator-comparator section, a protection circuit and an output circuit. The discriminator-comparator circuit provides that the control signal to the motor be independent of power supply variations. A tachometer signal of an AC nature is coupled into the discriminator-comparator circuit which generates a pulsed current. The number of current pulses generated over a given time interval corresponds to the frequency of the tachometer signal. These pulses are subtracted from a reference current which difference is integrated, with the integrated current difference indicating the difference in speed of the motor between the desired speed and the actual speed. The tachometer signal is fed directly to the discriminator-comparator without the necessity of providing pulse-shaping circuits. The output circuit converts this difference current to a variable voltage across the motor to control its speed. This conversion from a current drive to a voltage drive is accomplished in a common-emitter configuration such that the drive circuitry does not drop the voltage applied to the motor by any significant extent. The protection circuit utilizes current-limiting circuitry which is independent of supply voltage to provide overload protection and also to prevent overheating of the motor speed control circuit by limiting the current to the circuit either during overload or when a predetermined temperature has been exceeded.

10 Claims, 5 Drawing Figures

INVENTOR
Michael J. Gay

MOTOR SPEED CONTROL CIRCUIT

This is a continuation, of application Ser. No. 171,996 filed Aug. 16, 1971, now abandoned.

BACKGROUND OF THE INVENTION

This invention relates to motor speed control circuits and more particularly to a motor speed control circuit for use in battery-powered applications in which the motor speed control circuit works independently of the voltage delivered by the battery.

One of the most persistent problems in portable tape recorders and record players is the control of the speed of the tape drive or record drive motor. The problem arises essentially because these tape recorders or record players are powered by portable sources of power in which the voltage delivered by these sources varies considerably either due to the loading conditions or due to the running down of the battery.

While in the past there have been many motor speed control circuits which attempt to regulate the speed of the motor, these circuits, by and large, are heavily dependent on the supply voltage for the regulation. Further, because of the criticality of the speed control in the above applications, it has been found that these circuits must be temperature compensated in order to maintain a constant motor speed. Additional temperature compensation circuits as well as additional power supply regulating circuits not only involve increased drain on the battery, but also result in additional active components which raise the cost of the motor control circuit.

It is a feature of the subject circuit that temperature effects and voltage source variation effects are cancelled from the subject circuit. Further in the discriminator-comparator section of the circuit there is derived a difference current which is determined by the difference between the desired speed and the actual speed of the motor. This current is converted to a voltage and applied to the motor such that the motor speed is independent of temperature and power supply voltage variations. It is another feature of this circuit that this difference current is in fact very small.

A specialized output circuit is shown which not only effectively converts this very small error current signal into a useable voltage control signal, but also utilizes a common-emitter drive configuration. This common-emitter drive configuration is important because it does not lower the voltage delivered to the motor to any great extent. The importance of this latter function is as follows: Assume, for instance, that the motor is to be run from a 12-volt source and assume that the motor will not operate at all at a voltage below, for instance, 9.0 volts. Then assuming that the 12-volt source can at times dip to as low as 10.5 volts, it will be appreciated that any output circuit which drops this voltage by any more than 1.5 volts will not be acceptable. Because of the particular configuration of the subject output circuit, the supply voltage is dropped solely by the saturation voltage of the output transistor. The common-emitter drive is achieved by connecting the motor between the power supply and the collector of an output transistor which has an emitter coupled to ground. The voltage across the terminals of the motor is stabilized by a negative feedback circuit. This circuit consists of a feedback path developed between the collector of the output transistor and the input to the output circuit via a transistor. The primary purpose of this feedback path is to insure a low impedance node at the collector of the output transistor which in turn insures a voltage node drive for the DC motor. Additionally, this negative feedback circuit functions to limit or counteract the input current to the output circuit so as to stabilize the circuit. What has been accomplished by this particular output circuit is to convert a control current into a stabilized control voltage. Because the output circuit does not significantly absorb much of the supply voltage, the motor can be made to operate even when low voltage swings occur in the power supply.

The protection circuit is a current-limiting circuit which shunts drive current away from the aforementioned control transistor in response to any overheating condition. In addition the protection circuit limits the amount of current that can be drawn through the output circuit by also shunting current away from the drive to the output transistor. The protection circuit in general is powered by voltages which to a first approximation are independent of the supply voltage. These voltages are used as reference voltages such that the temperature and current protection is independent of supply voltage fluctuations. These power supply independent voltages are generated by a constant current from a constant current source through a zener diode to ground.

In the general operation of the circuit the speed of the motor is sensed by a tachometer circuit which generates a sinusoidal signal. This sinusoidal signal is fed, without clipping or pulse-shaping, to the discriminator-comparator circuit which generates a pulse of current each time the sinusoidal input signal goes negative. Over a period of time the number of such pulses generated by this portion of the circuit corresponds to the frequency of the tachometer circuit or the speed of the motor. These current pulses are subtracted from a reference current and the difference is integrated over time so as to develop a DC error current which is supplied to the base of an NPN transistor such that the current flowing in the collector of this transistor is an error current proportional to the difference in speed between the actual speed of the motor and that corresponding to the reference current.

The average current carried by the pulses generated during negative swings of the tachometer signal is the feedback current which represents the speed of the motor. Because the feedback current is subtracted from the reference current, the circuit is insensitive to variations of supply voltage or temperature as the reference and feedback currents are made to have a similar dependence on temperature and supply voltage. This reference current is preset by an external resistor. The value of this resistor as well as the value of an external capacitor determine the speed of the motor. This error current is delivered to the input of the output circuit. The servo system operates ideally such that when the current difference is zero the motor is running at the desired speed. In response to this error signal the output circuit drives the base of an output transistor connected between the motor and ground. The motor is connected between the V+ power supply and the collector of this output transistor. When the error signal increases the output transistor increases in conductivity. The voltage at the collector of the output transistor is thus lowered with respect to V+. This increases the voltage across the motor to speed the motor up. The collector of the output transistor is made a low impedance node by the use of negative feedback circuitry which couples the collector of the output transistor to the input of the output circuit. This negative feedback circuitry also stabilizes the output circuit while at the same time providing a voltage, rather than a current drive to the motor. It is well known that electric motors are more accurately controlled by voltage driving systems as opposed to current driving systems.

SUMMARY OF THE INVENTION

It is therefore an object of this invention to provide a motor speed control circuit in which the motor speed is independent of power supply variations.

It is a further object of this invention to provide a motor speed control circuit including a tachometer, a discriminator-comparator circuit, an output circuit and a protection circuit with the discriminator-comparator circuit operating independently of variations in the power supply voltage and temperature variations, and with the output circuit having current-limiting provision, the current to the output circuit being limited during overloading conditions and also during an overheating condition.

It is a still further object of this invention to provide a circuit for generating a current proportional to the frequency of a tachometer, subtracting this current from a reference current and generating a current proportional to the difference current to control the speed of a motor.

It is a further object of this invention to provide a motor speed control circuit in which the control signal to the motor is independent of power supply variations and in which the motor is controlled in a common-emitter drive circuit by a current-dependent voltage.

It is a still further object of this invention to provide a protection circuit for integrated circuit devices which reduces the current drive to an output circuit whenever a certain temperature has been exceeded or whenever current through the output circuit has exceeded a predetermined level.

It is a further object of this invention to provide an output circuit in a common-emitter configuration in which an input current is converted to an output voltage with the output voltage being utilized to control the speed of a DC electric motor.

Other objects and features of this invention will be better understood upon reading the following description taken in connection with the accompanying drawings.

BRIEF DESCRIPTION OF THE INVENTION

There is disclosed a motor speed control circuit for use in battery-powered tape recorders, tape players and record players in which the motor speed is made independent of power supply voltage swings, temperature and loading. The circuit is comprised of three sections including a discriminator-comparator section, a protection circuit and an output circuit. The discriminator-comparator circuit provides that the control signal to the motor be independent of power supply variations. A tachometer signal of an AC nature is coupled into the discriminator-comparator circuit which generates a pulsed current. The number of current pulses generated over a given time interval correspond to the frequency of the tachometer signal. These pulses are subtracted from a reference current which difference is integrated, with the integrated current difference indicating the difference in speed of the motor between the desired speed and the actual speed. The tachometer signal is fed directly to the discriminator-comparator without the necessity of providing pulse-shaping circuits. The output circuit converts this difference current to a variable voltage across the motor to control its speed. This conversion from a current drive to a voltage drive is accomplished in a common-emitter configuration such that the drive circuitry does not drop the voltage applied to the motor by any significant extent. The protection circuit utilizes current-limiting circuitry which is independent of supply voltage to provide overload protection and also to prevent overheating of the motor speed control circuit by limiting the current to the circuit either during overload or when a predetermined temperature has been exceeded.

DETAILED DESCRIPTION OF THE INVENTION

Figure 1:
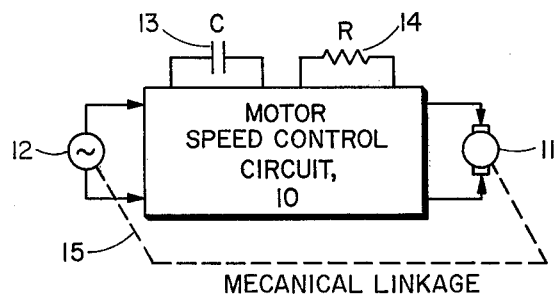
FIG. 1 is a block diagram of a motor speed control circuit showing the mechanical linkage between the motor and a tachometer.

As mentioned hereinbefore, the ability to achieve a motor speed control circuit such as that shown diagrammatically in FIG. 1 which is both independent of temperature and power supply variations and which can accommodate voltage swings in the power supply which would ordinarily cause the motor to stop running is a non-trivial problem. The problem of the independence of the system with respect to the power supply is accomplished primarily in the aforementioned discriminator-comparator circuit while the ability to drive a motor from low power supply voltages is primarily a function of the output circuit.

There is further provided protection circuitry which prevents overheating of the motor speed control circuit and which also protects the motor speed control circuit from the currents associated with overloading.

The basic circuit is shown in block diagram in FIG. 1 to be comprised of a motor speed control circuit 10 which is utilized to control the speed of a DC motor 11. This motor is mechanically linked to a tachometer 12 by a mechanical linkage shown by the dotted line 15 to complete a servo loop. The speed at which the motor is to run is uniquely determined by the capacitor 13 and the resistor 14 which can be connected externally to the speed control circuit 10. In the subject circuit, an error signal is developed corresponding to the difference in speed between the actual speed of the motor and the desired speed as set by the capacitor 13 and the resistor 14. This error signal is derived from the tachometer signal. The frequency of the tachometer signal is converted to a current which is effectively compared with a reference current generated by the resistive component 14 such that the net output from this comparison is amplified and used to adjust the speed of the motor in such a direction as to minimize the net output from this comparison.

Figure 2:
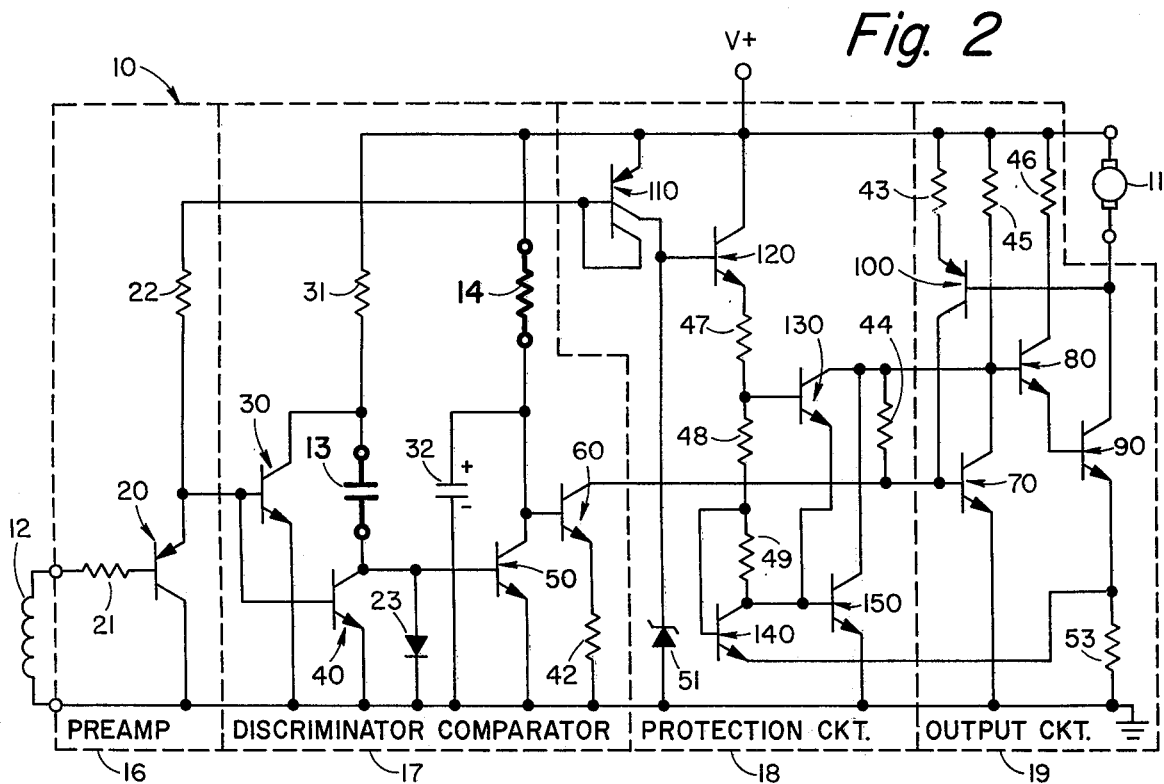
FIG. 2 is a schematic diagram of the entire circuit showing a pre-amplification stage, a discriminator-comparator stage, a protection circuit stage and an output stage.

The complete realization of this circuit is shown in FIG. 2. This circuit may be considered in three sections each performing separate functions resulting in the complete servo control of the DC motor 11. Exclusive of a pre-amplification section 16, the subject circuit is comprised basically of a frequency discriminator and comparator circuit 17, an error signal amplifier and motor drive output circuit 19 and a protection circuit 18.

DISCRIMINATOR-COMPARATOR CIRCUIT

The pre-amplifier circuit 16 and the discriminator-comparator circuit 17 will be described together. This section is comprised of transistors 20, 30, 40, 50 and 60; resistors 21, 22, 31, 14 and 42; capacitors 13 and 32 and the diode 23. It is the purpose of this section to develop an output current having an amplitude dependent on the difference between the input signal frequency received from the tachometer 12 and a reference frequency defined by the values of the components 13 and 14.

The operation of a circuit to produce a motor speed independent of supply voltage transistor and diode junction voltage and tachometer output voltage is as follows: The tachometer signal has a frequency $f_T$ corresponding to the speed of motor 11. If $f_T$ (the frequency of the tachometer when the motor speed is locked by the subject circuit) can be shown to be independent of the supply voltage ($V_S$) and certain junction voltages ($V_1$ and $V_{60}$), then the motor speed will be independent of both the supply voltage and junction voltages of the various active elements in the circuit. Junction voltage independence corresponds to temperature independence.

The tachometer signal is assumed to be an alternating periodic waveform of such amplitude that during part of each cycle (in this case, when the input signal goes negative) the transistor 20 absorbs all the current available through the resistor 22. This causes a current pulse to be formed by the remainder of the circuit. During another part of each cycle (when the input signal goes positive) at least a part of this current through resistor 22 is allowed to flow into the bases of the transistors 30 and 40. While this current flows into the bases of the transistors 30 and 40, their action is such as to reduce the potential on both terminals of the capacitor 13 to close to the so-called ground potential. When current flow into the bases of the transistors 30 and 40 ceases (i.e., when the input signal goes negative), then the current available through the resistor 31 ceases to be absorbed by the transistor 30 and commences to flow through the capacitor 13 and the diode 23 to ground. The current flow through the capacitor 13 causes an increasing voltage to develop across capacitor 13 such that the total charge that can be transferred through the capacitor 13 during one negative swing of the tachometer signal is limited in accordance with the value of the circuit supply voltage. The total charge flow during this negative swing is given by the formula:

$$\Delta Q = (V_S - V_1)(1 - e^{-t/C_{13}R_{31}})C_{13} \qquad 1$$

where $V_S$ is the supply voltage, $V_1$ is the voltage existing across the diode 23 at the time the transistors 30 and 40 recommence conduction and discharge the capacitor 13. $t$ is the period during which the capacitor 13 charges. It is this $\Delta Q$ charge flow which produces a current pulse in the collector of the transistor 50 each time the tachometer signal goes negative.

While the transistors 30 and 40 are in conduction, the voltage across the diode 23 is reduced to a level which allows insignificant current to flow through it. Thus no current is generated during positive input signal swings. The average current flow through the diode 23 is thus given by multiplying the above charge transfer per negative swing of the tachometer signal by the frequency of the tachometer signal ($f_T$) yielding the following formula:

$$\bar{I} = f_T (V_S - V_1)(1 - e^{-t/C_{13}R_{31}}) C_{13} \qquad 2$$

$\bar{I}$, then is a signal representing the frequency of the tachometer signal and thus the speed of the motor. According to the type of tachometer used, the charging period ($t$) of capacitor 13 may be various functions of the tachometer signal frequency. To insure an unambiguous speed setting it is merely necessary that the value of $\bar{I}$ increase monotonically with the tachometer frequency.

The diode 23 and the transistor 50 are of matched characteristics so that the flow of current through the diode 23 ($\bar{I}$) causes a known linearly related flow $\bar{I}'$ in the transistor 50. Thus, when a tachometer signal is applied to the circuit, an average current, $I'$, with a known linear relationship to the current $\bar{I}$ defined above, flows in the collector of the transistor 50. It is this $\bar{I}'$ current which is subtracted from a reference current to obtain a difference current which when amplified by the transistor 60 becomes the error signal in the servo loop. The $\bar{I}'$ current is subtracted from a reference current, $I_{ref}$, supplied through the resistor 14 and the difference current is fed to the base of the transistor 60. Since the current flow in the transistor 50 is in fact a series of pulses, an integrating capacitor 32 is incorporated to remove the alternating components therefrom. The reference current as supplied through the resistor 14 is given by the following formula:

$$I_{ref} = (V_S - V_{60})/R_{14} \qquad 3$$

where $V_{60}$ is the voltage necessary at the base of the transistor 60 for the absorption of any difference current.

The design of the following circuitry is such that the base current required by the transistor 60 in order that the motor 11 be powered is very small compared to the currents flowing in the resistor 14 and in the collector of the transistor 50. It will be appreciated that the circuit thus described operates with the two currents flowing in $R_{14}$ and transistor 50 being substantially equal so that when $\bar{I}' \simeq I_{ref}$ the motor speed is locked by the servo system and adjusts to correspond to a tachometer frequency $f_{T_1}$. Thus when the servo loop is locked, $I_{ref} = \bar{I}'$. The speed of the motor as represented by $f_{T_1}$ is found by equating equations 2 and 3 and solving for $f_T$ such that:

$$(4) \qquad f_T = f_{T_1} = \frac{(V_S - V_{60})A}{(V_S - V_1)(1 - e^{-t/C_{13}R_{31}})C_{13}R_{14}}$$

where A is a factor relating to the current flow in the transistor 50 collector to that through the diode 23.

Providing that the voltage drop across the resistor 42 in the emitter of the transistor 60 is small, then both $V_1$ and $V_{60}$ are essentially the voltage drop of the forward biased semiconductor junctions and are therefore substantially equal. Thus $V_1 = V_{60}$. The terms involving voltage in the above expression for $f_{T_1}$ are thus made to cancel in the first approximation leaving the form of the frequency of the tachometer circuit equal to the following formula:

$$(5) \quad f_{T_1} = \frac{1}{C_{13}R_{14}(1-e^{-t/C_{13}R_{31}})}$$

The product $C_{13}R_{31}$ is conveniently made somewhat less than $t$ such that the motor speed is predominately controlled by the product $C_{13}R_{14}$. Thus:

$$(6) \quad f_{T_1} \cong \frac{1}{C_{13}R_{14}}$$

Because of the absence of any voltage or period terms in equation 6, the circuit achieves a control over the motor speed which is substantially independent of supply voltage, transistor and diode junction voltages, and the tachometer output voltage. Further the control is independent of tachometer waveform provided that the tachometer output voltage is above a certain predetermined level. What has been formed therefore is a servo circuit in which a balance is obtained between the frequency of an incoming signal and an internally generated reference signal with the balance being substantially independent of variations in the circuit supply voltage, the level and waveform of the incoming signal, and the bias voltages required by the active elements of the circuit, provided only that these be similar. It will be appreciated that the difference current which is generated at the collector of transistor 60 is achieved by a circuit of great simplicity which is suitable for fabrication in integrated circuit form.

THE OUTPUT CIRCUIT

The error signal amplifier-motor drive output circuit 19 is now described. In order to obtain optimum performance with respect to feedback loop stability, response to transient loads and minimum short period speed variations, it is a requirement of the motor that it be voltage driven. This means that a given error between the motor speed and the speed indicated by the reference current must result in a particular voltage across the motor terminals rather than feeding a particular current through the motor. To obtain a minimum voltage loss across the motor drive transistor, a so-called common-emitter mode drive circuit is used in which the motor is connected between the collector of the output transistor and the supply line. In order both to maintain feedback loop stability and the voltage drive configuration, a shunt feedback loop comprised of the transistor 100 connected between the collector of the output transistor 90 and the base of the input transistor 70 is utilized so as to connect a shunt feedback loop around the output device. The feedback signal is derived from the voltage appearing across the motor terminals.

This feedback loop is achieved as shown in the output circuit 19 of FIG. 2 by means of the transistor 100 and the resistor 43, which feed back to the base of the transistor 70 a current derived from the voltage appearing across the motor 11. This current is opposite in phase to the input current supplied by the transistor 60 and thus constitutes a negative feedback signal. The feedback loop is completed by means of the inverting shunt feedback amplifier stage composed of the transistor 70, resistor 44, resistor 45, the emitter-follower transistor 80 and the output of the output transistor 90. High frequency stability is insured by the presence of motor suppression capacitors.

As mentioned before, the above circuit generates a negative feedback signal around the output section of the motor speed control circuit to generate voltage source conditions.

More particularly, if the feedback circuit were not used and both transistor 100 and resistor 43 were taken out of the circuit then the current generated by the transistor 60 would be drawn through the resistor 44 which is coupled between the collector and base of the transistor 70. The direction of the current is such that it would cause the collector of the transistor 70 to go positive thereby causing the transistor 80 and the transistor 90 to increase in conduction. This would increase the current through the motor which tends, however uncontrollably, to increase the speed of the motor. Because this is a DC motor it is characteristic that the motor is very poorly controlled by controlling the current through it. Without the aforementioned feedback circuit, the servo gain of the entire system is very poorly defined. There is thus a poorly defined relationship between the error current generated by transistor 60 and the speed of the motor. This is because the error current is applied across the resistor 44 which has a rather ill-defined relationship to the voltage appearing across the motor.

Taking, for instance, the case when the motor is slower than the reference speed, there will be a difference current through the transistor 60. This current is drawn as mentioned before through the resistor 44 and also through the resistor 45. This current is the normal base drive for transistor 70 and is shunted away from this base when transistor 60 conducts. This reduces the conduction of the transistor 70 thereby increasing the conduction of the transistors 80 and 90 so as to increase the current through the motor thereby increasing its speed.

However, if the output node of the output transistor 90, which in this case is its collector, can be made to have a low impedance rather than a high impedance, the primary effect across the motor will be voltage control as opposed to the current control. With the transistor 100 and the resistor 43 in the circuit and with the base of the transistor 100 coupled to the collector of the transistor 90, the error current through the transistor 60 is now made up of the current through the resistor 44 and also the current supplied from the collector of transistor 100. The current from the collector of the transistor 100 is in turn fairly dependent on the voltage developed across the motor so that the error current instead of being just a current through the resistor 44 which has a rather illdefined relationship to the voltage appearing across the motor is now mainly the current supplied through the transistor 100 which has a well-defined relationship to the voltage developed across the motor.

It will be appreciated that an alternative way of driving a DC motor would be to have the motor between the emitter of the transistor 90 and ground. This indeed would be a voltage drive. However, the amount of voltage absorbed by the output circuit would then be prohibitive insofar as the requirements of the motor might not be met by low swings of the battery power supply.

THE PROTECTION CIRCUIT

The protection circuit shown at 18 in FIG. 2 is now described. It will be appreciated that the major part of the entire circuit is suitable for manufacture in integrated circuit form. To protect the circuit from damage due to overload, two protection systems are incorporated. One of these limits the maximum output current which may be drawn from the circuit while the other limits the maximum temperature that the integrated circuit chip can reach. As mentioned hereinbefore, both of these protection systems operate on the principle of removing a drive current from the base of the transistor 80 which tends to make both it and transistor 90 less conductive thereby limiting the current drawn through the circuit and also the heat generated by this current. As shown in FIG. 2, the protection circuit is composed of a constant current source transistor 110, an emitter-follower transistor 120, the transistors 130, 140 and 150 and the zener diode 51. The biasing for the transistors 130, 140 and 150 is accomplished via the resistors 47, 48 and 49. The base of the transistor 120 is maintained by the zener diode 51, at a defined voltage above ground.

The circuit operates in the following manner; a PNP transistor 110 with collectors split in two parts supplies a current to the zener diode 51 thereby setting up a reference voltage which is substantially independent of temperature and circuit supply voltage. The reference voltage at the anode of the zener diode 51 is coupled to the base of the transistor 120 so as to define a current through the resistor chain composed of resistors 47, 48 and 49 and the transistor 140. This current is substantially constant so as to generate constant reference voltages across the resistors 48 and 49. Temperature limiting is obtained by the connection of the transistor 130 biased by the voltages across resistors 48 and 49 in such a manner that upon entering conduction the transistor 130 removes a portion of the base drive current available to the transistor 80 via the resistor 45. This therefore limits the output current which the circuits can supply and hence limits the circuit dissipation. This action is temperature controlled as a result of the application of a substantially constant bias voltage to the base of the transistor 130. It will be appreciated that the bias necessary to achieve a given conduction current has a negative temperature coefficient, in keeping with normal transistor characteristics, such that as the transistor 130 heats up, it becomes more conductive thereby shunting current away from the base of the transistor 80.

Current limiting is obtained by the connection of the transistor 150 in such a manner that upon entering conduction, it too removes a portion of the base drive available to the transistor 80. By biasing the transistor 150 with a voltage made up of the forward base-emitter voltage of the transistor 140 less the substantially constant voltage developed across the resistor 49 plus the voltage developed by the output current flowing through a resistor 53, the current at the base of the transistor 80 is regulated. When an overload current is sensed, the voltage at the ungrounded end of the resistor 53 rises. When this rises by an amount determined by the transistor 140 in connection with the resistor 49, the transistor 150 is rendered conductive thereby shunting the current away from the base of the transistor 80 which in turn reduces the conduction of the transistor 90 thereby limiting the current through the output circuit.

ALTERNATIVE CIRCUITS FOR PREAMPLIFIER CIRCUIT 16 AND DISCRIMINATOR-COMPARATOR CIRCUIT 17

Figures 3, 4, 5:
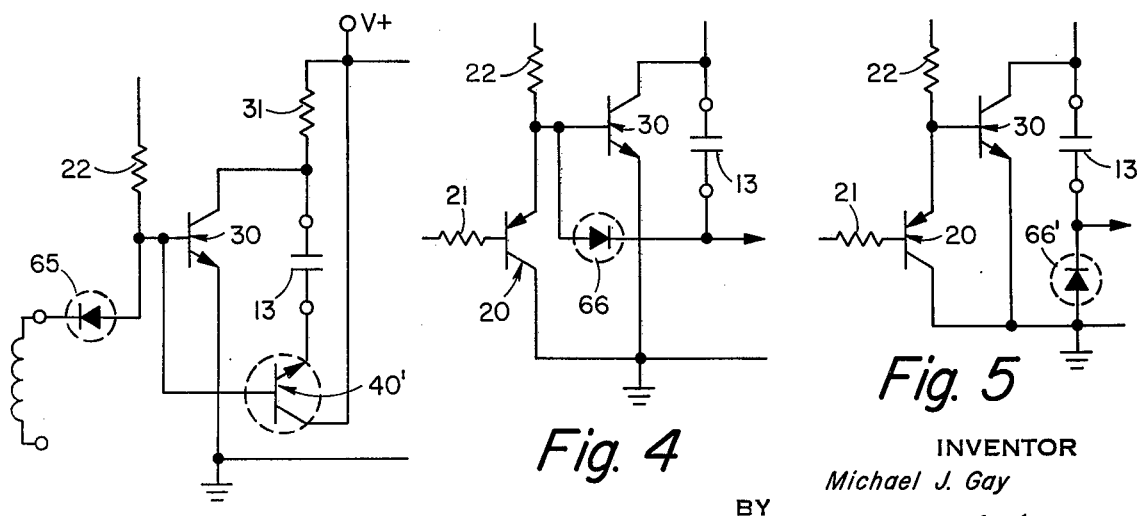
FIG. 3 indicates alternative circuits for use in the pre-amplification stage and in the discriminator-comparator stage.
FIGS. 4 and 5 show alternate embodiments of a portion of the circuit used in the discriminator-comparator stage.

In connection with FIG. 2, there are however variations on the sections comprising preamplification circuit 16 and discriminator-comparator circuit 17. These variations are shown in FIGS. 3, 4 and 5. The first variation (not shown) comprises the removal of the transistor 20 and the resistor 21, with the tachometer signal fed directly to the base of the transistor 30. Secondly, with respect to FIG. 3, it will be appreciated that the transistor 20 in the preamplification circuit 16 as well as the resistor 21 can be eliminated with the input function being provided by a diode 65 connected as shown between one of the inputs of the tachometer circuit 12 and the base of the transistor 30. Thirdly, and also in connection with FIG. 3, the NPN transistor 40 of the discriminator-comparator circuit 17 can be replaced with an NPN transistor 40' with the emitter of this transistor connected to one of the terminals of the capacitor 13. It will be appreciated that the collector of the transistor 40' is connected directly to V+.

Turning now to FIG. 4, it will be appreciated that either the transistor 40 of FIG. 2 or the transistor 40' of FIG. 3 may be replaced by a diode 66 or by the diode 66' as shown in FIG. 5. However, if the diode 66' is connected as shown in FIG. 5, an additional diode in series with the base of transistor 60 or other means to restore cancellation of transistor and diode junction voltages is required.

The modifications shown in connection with FIGS. 4 or 5 may, of course, be used in combination with any of the modifications of the preamplification circuit 16 discussed in connection with FIG. 3.

CONCLUSION

There is provided therefore a motor speed control circuit which does not require an input signal of any particular waveform and further does not involve the use of pulse shaping circuits. The error signal in the servo loop described above produces motor speed control which is independent of all critical voltages such as the supply voltage, transistor and diode junction voltages and out output voltages of the tachometer circuit used to drive the motor speed control circuit. The output circuit is arranged in such a manner that the motor can be operated by a supply voltage very close to the minimum voltage necessary to operate the motor. This is accomplished by the aforementioned use of a common-emitter output transistor. The aforementioned negative feedback circuitry provides that the output node of the output transistor in the drive circuit be a low impedance node. In addition, the negative feedback circuit increases the stability of the entire circuit. Finally, there is provided a protection circuit which both protects all the active elements from overload currents as well as limiting the temperature at which the entire circuit operates.

What is claimed is:

1. A circuit for controlling the speed of an electric motor such that the speed of the motor is independent of variations in supply voltage and temperature applied to said circuit, comprising:

means mechanically linked to the motor for generating an input signal having a frequency which varies proportionately to the speed of the motor;

means for generating a series of rectangular pulses of current, the magnitude of said current pulses being substantially constant with the number of said pulses generated over a predetermined time interval corresponding to the frequency of said input signal;

means for generating a reference current having a magnitude representing the desired speed of said motor and for subtracting said pulses of current from said reference current so as to develop an output current having an amplitude dependent on the difference of said pulses of current and said reference current, said pulse current and said reference current having similar dependencies on said supply voltage and temperature such that said output current is independent of the variations in the power supply voltage and temperature, said output current corresponding to the difference in the actual speed of the motor and the desired speed of the motor; and means responsive to said output current for generating voltage drive to the motor so as to control the speed of the motor, said voltage drive generating means including shunt feedback means being responsive to the voltage magnitude appearing across the motor for developing a negative feedback signal to ensure that a low impedance is presented in series with the motor and to stabilize the voltage drive to the motor.

2. The circuit as recited in claim 1 wherein said means for generating a pulsed current includes:

first electron control means having a first electrode, a second electrode and a control electrode, said control electrode being coupled to said means for generating an input signal, said first electrode being coupled to the supply voltage, and said second electrode being connected to the circuit reference terminal, said first electron control means being rendered conductive in response to one of the positive and negative portions of the input signal and said first electron control means being rendered non-conductive in response to the other of said positive and negative portions;

second electron control means having a first electrode, a second electrode and a control electrode, said control electrode being connected to said first electrode of said first electron control means, said first electrode of said second electron control means being connected to said reference terminal;

third electron control means having a first electrode, a second electrode and a control electrode, said control electrode of said third electron control means being connected to said control electrode of said second electron control means, said first electrode of said third electron control means being connected to said reference terminal, said second electron control means and said third electron control means being rendered conductive in response to said first electron control means being rendered non-conductive and said second and said third electron control means being rendered non-conductive in response to said first electron control means being rendered conductive;

capacitive means having a first terminal connected to said second electrode of said second electron control means and a second terminal connected to said second electrode of said third electron control means;

fourth electron control means connected between said second electrode of said third electron control means and said reference terminals, said fourth electron control means being rendered conductive in responsive to said second and third electron control means being rendered non-conductive;

first circuit means connected between said first terminal of said capacitive means and the supply voltage, said first circuit means being adapted for providing a current;

said second and said third electron control means discharging said capacitive means while conductive; and said fourth electron control means and said capacitive means conducting said current from said first circuit means in response to said second and said third electron control means being rendered non-conductive, said capacitive means being charged by said current conducted through said capacitive means and said fourth electron control means so as to develop current pulses which are proportional to the frequency of said input signal.

3. The circuit as recited in claim 2 wherein said means for generating a reference current and for subtracting said pulsed current from said reference current includes:

fifth electron control means having a first electrode, a second electrode and a control electrode, said first electrode being coupled to said reference terminal, and said second electrode being coupled to said means for converting said output current into a voltage;

second circuit means being connected between said control electrode of said fifth electron control means and said supply voltage, said second circuit means and said fifth electron control means providing a reference current proportional to the desired speed of the electric motor;

sixth electron control means having a first electrode, a second electrode and a control electrode, said control electrode fo said sixth electron control means being connected to said second electrode of said third electron control means said first electrode being connected to said reference terminal, and said second electrode of said sixth electron control means being connected to said control electrode of said fifth electron control means;

second capacitive means being connected between said control electrode of said fifth electron control means and said reference terminal;

said sixth electron control means being rendered conductive in response to said fourth electron control means being rendered conductive so that a current which is proportional to said pulsed current is conducted by said sixth electron control means, said current conducted through said sixth electron control means being subtracted from said reference current to provide a difference current; and said difference current being amplified by said fifth electron control means.

4. The circuit as recited in claim 1 wherein said means for generating voltage drive to the motor includes:

output circuit means for effecting a low impedance drive circuit to the motor so as to generate a voltage drive signal across said pair of terminals of the motor to control the speed thereof;

input circuit means for amplifying said output current from said means for generating a reference current means and applying said amplified output current to said output circuit means; and said shunt feedback means being coupled between said output circuit means and said input circuit means and being responsive to the magnitude of the voltage appearing across said terminals of the motor for generating a feedback signal to insure feedback loop stability and said voltage drive configuration, said feedback signal being applied to said input circuit means.

5. The circuit of claim 4 wherein said output circuit means includes:

first electron control means having first and second electrodes and a control electrode, said first electrode being coupled to a reference terminal of the circuit, said second electrode being connected to the second of said pair of terminals of the motor;

second electron control means having first and second electrodes and a control electrode, said first electrode of said second electron control means being connected to said control electrode of said first electron control means, said second electrode of said second electron control means being coupled to the first of said pair of terminals of the motor; and said input circuit means includes third electron control means having first and second electrodes and a control electrode, said first electrode of said third electron control means being connected to said reference terminal, said second electrode of said third electron control means being connected to said control electrode of said second electron control means and said control electrode being adapted to receive said output current from said means for generating a reference current.

6. The circuit as recited in claim 5 wherein said shunt feedback circuit means includes:

fourth electron control means having first and second electrodes and a control electrode, said second electrode of said fourth electron control means being connected to said control electrode of said third electron control means, said first electrode being coupled to said first terminal of the motor, said control electrode being connected to said electrode of said first electron control means of said output circuit;

said second electrode of said third electron control means being coupled to said first terminal of the motor; and said first terminal of the motor being connected to the supply voltage.

7. The circuit as recited in claim 1 wherein said pulse generating means includes:

a first capacitors, means for charging said capacitor during a portion of said input signal and for isolating said capacitor from any voltage applied thereacross during all other portions of said input signal, said means for charging said capacitor including a resistive path through which charge from said capacitor is allowed to flow, the charge through said resistive path forming a pulse of current having an amplitude duration relationship substantially set by the time constant of said capcacitor and voltage supplied across said capacitor, whereby a number of said pulses recurring over a period of time yield a current proportional to the speed of said motor.

8. The circuit as recited in claim 7 wherein said resistive path includes a diode between the one terminal of said capacitor and ground and wherein said means for charging said capacitor includes a first resistor between said voltage supply, the other terminal of said capacitor, and a common emitter transistor having its base coupled to said one terminal and its emitter coupled to ground, the collector of said common emitter transistor being coupled to the output of said means for generating said reference current, and means for integrating said output current so as to remove alternating components therefrom.

9. The circuit as recited in claim 8 wherein the average current generated across said diode is $\bar{I} = f_T (V_S - V_1)(1 - e^{-t/CR}) C$ where $f_T$ is the frequency of said input signal $V_S$ is said supply voltage $V_1$ is the voltage across said diode at the time said first capacitor is discharged C is the capacitance of said first capacitor R is the resistance of said first resistor, and $t$ is the period during which said first capacitor charges.

10. The circuit as recited in claim 8 wherein said means for generating a reference current includes a second resistor coupled between said supply voltage and the collector of said emitter-follower transistor, and further including means for amplifying the difference current at the collector of said common-emitter transistor, said means including a coupling transistor having its base connected to the collector of said emitter-follower transistor and its emitter coupled to ground, whereby said reference current $I_{ref} = (V_S - V_C)/R_s$ where $V_C$ is the voltage necessary at the base of said coupling transistor for the absorption of any difference current and where $R_s$ is the value of said second resistor, such that $$f_T \approx \frac{1}{CR_s}$$

whenever said motor is locked to said desired speed by said circuit.

* * * * *